Patented Sept. 6, 1949

2,481,044

UNITED STATES PATENT OFFICE 2,481,044

POLYMERIZATION OF 1,3-DIENES IN THE PRESENCE OF BENZYLIC IODIDES

George W. Scott, Wilmington, Del., assignor to E. I. du Pont de Nemours & Company, Wilmington, Del., a corporation of Delaware No Drawing. Application May 23, 1946, Serial No. 671,915

9 Claims. (Cl. 260—92.3)

This invention relates to an improved method of modifying the polymerization of 1,3-dienes and interpolymerization of the same with monoolefinic polymerizable compounds, and to new and improved polymers produced thereby.

In the polymerization of 1,3-dienes in the absence of modifying agents, polymers are obtained normally which are tough and dry and which are therefore difficult or impossible to handle in the usual types of rubber processing machinery. Modifying agents are therefore usually employed to give polymers which are soft and which are readily processable or which can be made soft and readily processable by mechanical working or by the addition of small amounts of peptizing agents (chemical softeners). The commonly used modifying agents are sulfur or sulfur-containing substances such as mercaptans, which are employed usually in amounts up to 2% of the weight of the polymers. In addition to its modifying effect, sulfur, when present during the polymerization, particularly of chloroprene, improves the physical properties of films of the polymers deposited directly from their aqueous dispersions. In general, the improved plasticity of the synthetic rubbers of the 1,3-diene types is obtained by the addition of reagents which ordinarily retard polymerization, such as sulfur or sulfur compounds, and therefore it has been necessary to employ with these modifying agents catalysts or accelerators which increase the rate of polymerization.

Sulfur and sulfur-containing compounds often render synthetic elastomers unsuitable for certain uses because of the presence of the sulfur in the finished elastomer, and usually they impart to the elastomer an odor which, in many cases, is undesirable. It is therefore desirable that modifiers for 1,3-diene-type elastomers be produced which do not impart to the synthetic elastomers the objectionable properties imparted thereto by the sulfur or sulfur-containing compounds and which are free from the metal compounds often required to effect polymerization when sulfur or sulfur compounds are used as modifying agents.

It is therefore an object of this invention to provide a method for modifying the polymerization and interpolymerization of 1,3-dienes which will not introduce sulfur into the resulting polymer, making possible the production of sulfur-free elastomers. It is a further object of the invention to provide a process for producing chloroprene and butadiene polymers which have improved storage stability, flatter curing range and better resistance to heat aging, and to cut growth, than are normally obtained by the use of sulfur modifying agents. It is a further object of the invention to provide a process for the polymerization of 1,3-dienes which will permit a more rapid polymerization than when sulfur or sulfur-containing compounds are employed, thereby resulting in increased production and/or decrease in the amount of polymerization catalyst needed to carry out the process. A still further object is to provide a process for producing polymers of 1,3-dienes which have improved working properties and which result in more stable latices because of the lower concentration of electrolytes present therein, and one which produces polymers of 1,3-dienes free from the objectionable odor associated with sulfur compounds. Another object of the invention is to provide a method of modifying the polymerization and interpolymerization of 1,3-dienes with agents which, when used in only relatively small amounts, give plastic polymers particularly suitable for use in cements of low viscosity and high solids content.

I have found that the objects as above set forth can be accomplished by carrying out the polymerization of 1,3-dienes, such as 1,3-butadiene and 2-chloro-1,3-butadiene, or the interpolymerization of these dienes with each other or with monoolefinic polymerizable materials in the presence of small amounts of aromatic iodo compounds of the formula:

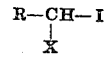

in which R stands for an aromatic radical of the benzene and napthalene series, which aromatic radical may contain not more than three substituents of the class consisting of halogen, methyl and nitro radicals, and in which X stands for hydrogen or a halogen of the group consisting of Cl, Br and I. The compounds falling within this class are those aromatic compounds which contain from 7 to 14 carbon atoms and which include the aliphatic side chain:

wherein X has the same significance as above given. The following compounds are given as illustrations of the compounds falling within the general formula, and which are contemplated for use in carrying out the process of the present invention: benzyl iodide, o-, m- or p-nitrobenzyl iodide, 2,4-dinitrobenzyl iodide, other dinitrobenzyl iodides, trinitrobenzyl iodides, o-, m- or p-chlorobenzyl iodides, o-, m- or p-bromobenzyl iodides, o-, m- or p-iodobenzyl iodides, dichlorobenzyl iodides, trichlorobenzyl iodides, dibromobenzyl iodides, tribromobenzyl iodides, diiodobenzyl iodides, o-, m- or p-methylbenzyl iodides, dimethylbenzyl iodides, trimethylbenzyl iodides, alpha- or beta-iodomethyl naphthaline, halogeno-, nitro- or methyl-substituted alpha- or beta-iodomethyl naphthalene, alpha-iodo-alpha-chlorotoluene, alpha-iodo-alpha-bromotoluene, alpha, alpha-diiodotoluene, alpha-iodo-alpha-chloro-o-, m- or p-halogen, nitro or methyl substituted toluenes, etc.

The iodomethyl naphthalene compounds mentioned above are made by the conventional method wherein the corresponding chloride is reacted with sodium or potassium iodide in alcoholic solution.

The following examples are given to illustrate the invention. The parts used are by weight, unless otherwise specified.

Example 1

Chloroprene was polymerized in an emulsion at 40° C., using the following recipe, the modifying agent and rosin being first dissolved in the chloroprene, which was then emulsified in the water containing the other ingredients.

| | Parts |
|---|---|
| Chloroprene | 100 |
| Water | 147.5 |
| Dispersing agent [1] | 0.75 |
| Nancy wood rosin | 4.0 |
| Sodium hydroxide | 0.9 |
| Potassium persulfate | 0.6 |

[1] Sodium salt of a reaction product of naphthalene, sulfuric acid and formaldehyde.

Modifying agent, as indicated

In each case, the polymerization was stopped when the emulsion reached a specific gravity of 1.057 to 1.058 by the addition of 2.5 parts of tetraethyl thiuram disulfide dispersed in water. The emulsion was coagulated by freezing in thin layers and the polymer was washed with water, dried with warm air and milled. The resulting data are tabulated below:

| Modifying Agent | Per Cent Yield | Williams [1] Plasticity Number | Recovery | Millability [2] |
|---|---|---|---|---|
| None | 85 | 346 | 184 | Very poor. |
| 1.0 part Benzyl iodide | 87 | 99 | 14 | Good. |
| 1.0 part m-Nitrobenzyl iodide | 84 | 90 | 5 | |
| 1.0 part p-Nitrobenzyl iodide | 88 | 48 | 1 | |
| 0.25 part 2,4-Dinitrobenzyl iodide | 88 | 106 | 12 | Excellent. |
| 0.50 part o-Chlorobenzyl iodide | 85 | 146 | 139 | Good. |
| 0.50 part o-Trimethylbenzyl iodide | 87 | 127 | 79 | Do. |
| 0.25 part alpha-Iodomethyl-beta-methyl naphthalene.[3] | 87 | 149 | 141 | Poor. |
| 1.0 part alpha-Iodo-alpha-chlorotoluene | 90.5 | 133 | 90 | Do. |
| 0.25 part alpha-Iodo-alpha-bromo-p-nitrotoluene | 90 | 185 | 188 | Very poor. |

[1] Based on method described by Williams, Ind. Eng. Chem. 16, 362 (1924). The lower numbers represent the greater plasticities.
[2] Very poor=tough polymer which fails to band on a mill; Poor=tough polymer which forms a very poor band held together by a few strands; Good=polymer which forms a coherent band on the mill, making compounding possible; Excellent=polymer which forms a smooth continuous band on the mill.
[3] Only 0.08 part of potassium persulfate used.

This example shows that benzylic iodides are very effective modifying agents for chloroprene polymerization.

Example 2

The effect of the concentration of these modifying agents on the degree of modification of chloroprene polymerization is shown by the following series of polymers prepared as in Example 1:

| Modifying Agent | Per Cent Yield | Williams Plasticity Number | Recovery | Description of Polymer |
|---|---|---|---|---|
| None | 85 | 346 | 184 | Tough and dry. |
| 0.125 part 2,4-Dinitrobenzyl iodide | 84 | 203 | 177 | Do. |
| 0.175 part 2,4-Dinitrobenzyl iodide | 89.5 | 182 | 193 | Do. |
| 0.25 part 2,4-Dinitrobenzyl iodide | 88 | 106 | 12 | Well plasticized and millable. |
| 0.25 part p-Nitrobenzyl iodide | 90 | 185 | 185 | Tough and dry. |
| 0.50 part p-Nitrobenzyl iodide | 89.5 | 96 | 7 | Well plasticized and millable. |
| 1.00 part p-Nitrobenzyl iodide | 88 | 48 | 1 | Extremely soft and tacky. |

This example shows that these benzylic iodides are effective at low concentrations for producing substantial modification of chloroprene, with small variations in concentration resulting in polymers of quite different physical properties. The soft polymers prepared with the high concentrations of 2,4-dinitrobenzyl iodide are effective for producing low viscosity cements with high solids content.

Example 3

Polymers prepared with benzylic iodides as modifying agents give vulcanizates which have high tensile strength and good elongation at break. These polymers are compared to sulfur modified polymer in the following tread stock:

| | Parts |
|---|---|
| Polymer | 100 |
| Phenyl-alpha-naphthylamine | 2 |
| Medium processing channel black | 36 |
| Magnesium oxide | 4 |
| Zinc oxide | 5 |

| Modifying Agent | Cure: Mins. at 287° F. | 300% Modulus, Lbs./sq. in. | Tensile Strength, Lbs./sq. in. | Elongation at Break, Per Cent |
|---|---|---|---|---|
| 1 part Benzyl Iodide | 30 | 1,110 | 3,580 | 630 |
| 1 part m-Nitrobenzyl Iodide | 30 | 1,170 | 3,780 | 640 |
| 0.25 part p-Nitrobenzyl Iodide | 30 | 1,080 | 3,550 | 630 |
| 0.25 part 2,4-Dinitrobenzyl Iodide | 30 | 1,450 | 4,290 | 610 |
| 0.25 part alpha-Iodo-methyl-beta-Methyl Naphthalene | 30 | 1,480 | 4,200 | 600 |
| 1 part alpha-Iodo-alpha-Chlorotoluene | 30 | 1,250 | 3,980 | 640 |
| 0.60 part Sulfur | 15 | 1,140 | 3,520 | 650 |

Example 4

This illustrates the use of 2,4-dinitrobenzyl iodide in the polymerization of chloroprene in acidic emulsions. Chloroprene was polymerized at 40° C. in the following emulsion:

|   | Parts |
|---|---|
| Chloroprene | 100 |
| Water | 150 |
| Dispersing agent [1] | 2 |
| Sodium salt of lauryl sulfate | 1 |
| Acetic acid | 0.5 |
| Potassium persulfate | 0.75 |
| 2,4-dinitrobenzyl iodide | 0.5 |

[1] Sodium salt of a reaction product of naphthalene, sulfuric acid and formaldehyde.

The polymerization was stopped at 86% product yield by the addition of 2 parts of a 55% N-phenyl-alpha-naphthylamine-45% diphenylamine mixture and 0.1 part of phenthiazine. The latex was coagulated with a mixture of brine and ethyl alcohol and the polymer was washed and dried on a mill. The plasticity number was 50 and the recovery zero. Milling was good.

Example 5

This illustrates the use of 2,4-dinitrobenzyl iodide in the polymerization of chloroprene to give a modified polychloroprene latex. Chloroprene was polymerized at 40° C. under a nitrogen atmosphere to a polymer yield of 98% in an emulsion prepared as indicated by the following recipe.

|   | Parts |
|---|---|
| Chloroprene | 100 |
| Water | 100 |
| Nancy wood rosin | 4 |
| Sodium hydroxide | 1.056 |
| Potassium persulfate | 0.4 |
| Sulfur | 0.01 |
| 2,4-dinitrobenzyl iodide | 0.1 |

The finished latex was compounded as follows:

|   | Parts |
|---|---|
| Latex | 200 |
| Hard clay | 10 |
| Zinc oxide | 5 |
| Phenyl-beta-naphthylamine | 2 |

A dip film was prepared from the compounded latex and cured in air for 15 minutes at 140° C. The 600% modulus (1100 lbs. per sq. in.) of this cured film was much lower than that (1525 lbs. per sq. in.) of a similar film from a latex made in the absence of 2,4-dinitrobenzyl iodide, indicating 2,4-dinitrobenzyl iodide to be an effective modifying agent for polychloroprene latex.

Example 6

Polymers from mixtures of 75 parts of butadiene-1,3 and 25 parts of styrene were prepared, using the following emulsion, in order to compare the modifying actions of alpha-iodo-beta-methyl naphthalene and dodecyl mercaptan:

|   | Parts |
|---|---|
| Monomer mixture | 100 |
| Water | 150 |
| Dispersing agent [1] | 4 |
| Oleic acid | 1 |
| Potassium persulfate | 1 |
| Sodium hydroxide | 1.325 |
| Modifying agents, as indicated. |   |

[1] Sodium salt of a reaction product of naphthalene, sulfuric acid and formaldehyde.

The polymerizations were run for 20 hours at 50° C., then stabilized with 3 parts of a 55% N-phenyl - alpha - naphthylamine - 45% diphenylamine mixture. The latices were coagulated with a brine-acetic acid mixture and the polymers were washed and dried on a mill. The physical properties of these polymers are:

| Modifying Agent | Physical Properties | Millability |
|---|---|---|
| 0.05 part Dodecyl "DD" Mercaptan. | Very tough and dry polymer. | Very poor. |
| 0.05 part DD Mercaptan + 0.5 part alpha-Iodo-methyl-beta-Methyl Naphthalene. | Very soft and tacky polymer. | Good. |
| 0.5 part alpha-Iodomethyl-beta-Methyl Naphthalene. | ----do-------------- | Do. |

The above examples show that these benzylic iodides are unusually effective modifying agents for the polymerization of dienes and for the interpolymerizations of dienes with mono-olefinic compounds.

The aromatic iodo compounds of the formula given are effective modifying agents over a wide temperature range, with the preferred temperatures being between 5° and 55° C. They may be employed in amounts varying from 0.01% to 10.0%, based on the weight of the polymerizable materials with which they are incorporated. For the preparation of polymers having good milling properties, the amounts to be used may vary from 0.10% to 2.0%. Where extremely soft and plastic polymers are desired, or where the resulting polymer is to be used in cements of low viscosity and high solids content, as high as 10% of these modifying agents may be used, based on the weight of the polymerizable material with which they are employed. These modifying agents are effective in both alkaline and acid emulsions and also when used alone or when used in combination with other modifying agents such as sulfur or mercaptans.

These aromatic iodo compounds may be used as modifying agents in any of the usual polymerization systems, for example, in sodium and other rosinate emulsion systems or where the emulsifying agents are ethylene oxide-higher alcohol condensation products or the alkali salts of sulfonated alkyl alcohols, of fatty acids, or of aliphatic and aromatic sulfonates. If desired, the polymerization may be accelerated by the use of the usual accelerator such as potassium persulfate or other soluble persulfate, benzoyl peroxide, hydrogen peroxide, and the like. These aromatic iodo compounds are also effective modifying agents for solution or for massive polymerization of the 1,3-dienes and mixtures thereof with the other polymerizable compounds.

The aromatic iodo compounds of the formula given modify the polymerization of 1,3-dienes such as chloroprene and 1,3-butadiene, and the interpolymerization of such dienes with each other or with mono-olefinic polymerizable compounds which are polymerizable with 1,3-dienes such as styrene or acrylonitrile, acrylates, alkylacrylates, etc. This invention is particularly applicable in the polymerization of 1,3-dienes such as chloroprene, 1,3-butadiene, etc., and in the interpolymerization of mixtures of the same with each other or in mixtures with mono-olefinic polymerizable compounds where the mixture contains at least 50% of the 1,3-diene.

This invention provides modifying agents which do not contain sulfur, making possible the production of sulfur-free elastomers similar to those modified with iodoform. These modifying agents give chloroprene polymers which have improved storage stability, flatter curing range and better resistance to heat aging and to cut growth than sulfur modified polymers. These modifying agents allow more rapid polymerization than an equivalent amount of sulfur, resulting in increased production or in a decrease in the amount of catalyst necessary. In the case of the production of a synthetic latex, this latter effect results in a more stable latex because of lower concentration of electrolytes. A further advantage is that the use of these compounds eliminates the odor often associated with sulfur compounds, and polymers are produced having good working properties.

It is possible with these modifying agents to obtain very plastic polymers for use in cements of low viscosity and high solids content.

I claim:

1. A method for preparing readily processable rubber-like polymers of 1,3-butadiene compounds of the group consisting of 2-chloro-1,3-butadiene and 1,3-butadiene which comprises carrying out the polymerization of the monomeric material, which contains at least 50% of the 1,3-butadiene compound, in the presence of from 0.10% to 10.0%, based on the weight of the polymerizable material, of an aromatic iodo compound of the formula:

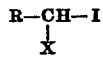

in which R stands for a radical of the group consisting of the phenyl, naphthyl and the halogen, nitro and methyl-substituted phenyl and naphthyl radicals, which radicals contain not more than 13 carbon atoms, and in which X stands for a substituent of the group consisting of hydrogen and halogen.

2. A method for preparing readily processable rubber-like polymers of 1,3-butadiene compounds of the group consisting of 2-chloro-1,3-butadiene and 1,3-butadiene which comprises carrying out the polymerization of the monomeric material, which contains at least 50% of the 1,3-butadiene compound, in an aqueous emulsion and in the presence of from 0.10% to 10.0%, based on the weight of the 1,3-diene, of an aromatic iodo compound of the formula:

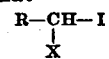

in which R stands for a radical of the group consisting of the phenyl, naphthyl and the halogen, nitro and methyl-substituted phenyl and naphthyl radicals, which radicals contain not more than 13 carbon atoms, and in which X stands for a substituent of the group consisting of hydrogen and halogen.

3. A method for preparing a readily processable rubber-like polymer of 1,3-butadiene which comprises carrying out the polymerization of the 1,3-butadiene in the presence of from 0.10% to 10.0%, based on the weight of the 1,3-butadiene, of an aromatic iodo compound of the formula:

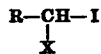

in which R stands for a radical of the group consisting of the phenyl, naphthyl and the halogen, nitro and methyl-substituted phenyl and naphthyl radicals, which radicals contain not more than 13 carbon atoms, and in which X stands for a substituent of the group consisting of hydrogen and halogen.

4. A method for preparing a readily processable rubber-like polymer of 1,3-butadiene which comprises carrying out the polymerization of the 1,3-butadiene in an aqueous emulsion and in the presence of from 0.10% to 10.0%, based on the weight of the 1,3-butadiene, of an aromatic iodo compound of the formula:

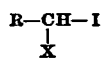

in which R stands for a radical of the group consisting of the phenyl, naphthyl and the halogen, nitro and methyl-substituted phenyl and naphthyl radicals, which radicals contain not more than 13 carbon atoms, and in which X stands for a substituent of the group consisting of hydrogen and halogen.

5. A method for preparing readily processable rubber-like polymers of 1,3-butadiene which comprises carrying out the polymerization of the 1,3-butadiene in an aqueous emulsion and in the presence of from 0.10% to 10.0% of 2,4-dinitrobenzyl iodide, based on the weight of the 1,3-butadiene.

6. A method for preparing readily processable polychloroprene which comprises carrying out the polymerization of 2-chlorobutadiene-1,3 in an aqueous emulsion and in the presence of from 0.10% to 10.0%, based on the weight of the 2-chlorobutadiene-1,3, of an aromatic idodo compound of the formula:

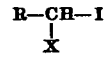

in which R stands for a radical of the group consisting of the phenyl, naphthyl and the halogen, nitro and methyl-substituted phenyl and naphthyl radicals, which radicals contain not more than 13 carbon atoms, and in which X stands for a substituent of the group consisting of hydrogen and halogen.

7. A method for preparing readily processable polychloroprene which comprises carrying out the polymerization of 2-chlorobutadiene-1,3 in an aqueous emulsion and in the presence of from 0.10% to 10.0% of 2,4-dinitrobenzyl iodide, based on the weight of the 2-chlorobutadiene-1,3.

8. A method for preparing readily processable polychloroprene which comprises carrying out the polymerization of 2-chlorobutadiene-1,3 in an aqueous emulsion and in the presence of from 0.10% to 10.0% of benzyl iodide, based on the weight of 2-chlorobutadiene-1,3.

9. A method for preparing readily processable polychloroprene which comprises carrying out the polymerization of 2-chlorobutadiene-1,3 in an aqueous emulsion and in the presence of from 0.10% to 10.0% of p-nitrobenzyl iodide, based on the weight of 2-chlorobutadiene-1,3.

GEORGE W. SCOTT.

No references cited.

Certificate of Correction

Patent No. 2,481,044 September 6, 1949

GEORGE W. SCOTT

It is hereby certified that error appears in the printed specification of the above numbered patent requiring correction as follows:

Column 6, line 41, for "0.01%" read *0.10%*;

and that the said Letters Patent should be read with this correction therein that the same may conform to the record of the case in the Patent Office.

Signed and sealed this 14th day of February, A. D. 1950.

[SEAL]

THOMAS F. MURPHY,
*Assistant Commissioner of Patents.*